United States Patent [19]

Williams et al.

[11] Patent Number: 5,731,902

[45] Date of Patent: Mar. 24, 1998

[54] HEAD-UP DISPLAY COMBINER BINOCULAR TEST FIXTURE

[75] Inventors: Robert D. Williams, Goleta; Michael Kinoshita, Redondo Beach; Darcy J. Hart, nee Morgan, Irvine, all of Calif.

[73] Assignee: Delco Electronics Corporation, Kokomo, Ind.

[21] Appl. No.: 700,070

[22] Filed: Aug. 19, 1996

[51] Int. Cl.$^6$ .................................... G02B 27/14
[52] U.S. Cl. ................ 359/630; 359/632; 359/201; 359/202
[58] Field of Search .................. 359/630, 632, 359/201, 202

[56] References Cited

U.S. PATENT DOCUMENTS

| | | | |
|---|---|---|---|
| 5,334,991 | 8/1994 | Wells et al. | 359/630 |
| 5,381,267 | 1/1995 | Woody | 359/630 |
| 5,384,654 | 1/1995 | Iba | 359/630 |

*Primary Examiner*—Frank G. Font
*Assistant Examiner*—Reginald A. Ratliff
*Attorney, Agent, or Firm*—Jimmy L. Funke

[57] ABSTRACT

A dual camera test fixture that allows quantitative optical performance measurements to be made on a combiner, which is the primary optical element of a head-up display optical system. The fixture replicates an embodiment of the head-up display system, with the cameras in place of a users eyes. This configuration allows quantitative optical measurements to be made, just as the user would observe them. The test fixture makes quantitative measurements of the optical performance of individual combiners. The measurements that are made are binocular, and the measurement time is less than one minute per combiner. The test fixture determines actual coordinates of an image produced by the combiner. These coordinates allow accurate and quantitative calculations regarding the combiner to be made including vertical disparity, image distance, percent distortion, and image size. The cameras are adjustable in a manner that simulates the motion of human eyes as well as the motion of the human head. A calibration mode that is part of an operational software program is used with calibration targets and allows the cameras to be precisely positioned. This also minimizes measurement error, and provides for excellent repeatability from lot to lot and day to day.

5 Claims, 3 Drawing Sheets

HEAD-UP DISPLAY COMBINER BINOCULAR TEST FIXTURE

BACKGROUND OF THE INVENTION

The present invention relates to head up displays, and more particularly, to a test fixture for use in testing a head up display system having a biocular combiner.

The assignee of the present invention designs and develops head-up displays for use in commercial vehicles, such as police cars and delivery vans, for example. The packaging constraints for mounting the head-up displays in these vehicles requires that the head-up display operate with its image projector disposed at a skewed off-axis angle relative to the drive's eyes. The head-up displays use an optical combiner that is the primary optical element in the system. Heretofore, no provisions have been made to easily test the optical combiners and head-up display in an operational environment.

Prior to the development of the present test fixture, combiners were measured manually using a theodolite. To do this, the operator has to move the theodolite to the left eye position, level it, then measure the x and y locations of many points and record those locations. The operation would then move the theodolite to the right eye position, level it, and repeat the measurements. Calculations were then performed to calculate the performance of the combiner. Each combiner took approximately one hour to measure. This procedure was thus very time consuming and expensive. In addition, a Ronchi test was also used that produces a moiré pattern. This test, as well as other standard optical measurements, do not produce quantitative numbers such as disparity that relate directly to the optical performance of the combiner as viewed by a human observer as does the present invention.

Therefore, it is an objective of the present invention to provide for a test fixture for use in testing a head up display system and its biocular combiner.

SUMMARY OF THE INVENTION

In order to meet the above and other objectives, the present invention is a portable dual camera test fixture that allows quantitative optical performance measurements to be made on a combiner, which is the primary optical element of a head-up display optical system. The fixture replicates an embodiment of the head-up display system, with two cameras in place of a user's eyes. This configuration allows quantitative optical measurements to be made, just as the user would observe them. The test fixture may also be used to measure the performance of other optical configurations.

The test apparatus comprises a test reticle having a predistorted test pattern including a plurality of dots disposed in the projection unit. The pattern is configured to produce a rectilinear image when viewed with a correctly-made combiner. A test fixture is provided for holding the combiner. The combiner magnifies the predistorted test pattern to form a virtual image at a predetermined distance in front of the projection unit. Left and right cameras are disposed a predetermined distance apart that are angled with respect to the combiner to replicate the function and separation of human eyes. A rectilinear target is disposed a predetermined distance from the cameras for calibrating the test apparatus.

A processor is coupled to the left and right cameras for calibrating the apparatus by processing images of the rectilinear target produced by the cameras, for calculating x and y coordinates of centers of each dot in the test pattern, and for storing the coordinates for use as a reference that images produced by the test reticle should duplicate. The processor also tests the combiner by processing images of the test reticle projected through the combiner and produced by the cameras, stores the images of the projected test reticle produced by the cameras, determines the coordinates of the center point of each dot of the projected test reticle. The processor also calculates a plurality of values that are indicative of the optical quality of the combiner. The values include vertical and horizontal disparity values, average vertical and horizontal distortion values, and a value corresponding to the image size in degrees in vertical and horizontal directions.

The test fixture is capable of making quick quantitative measurements of the optical performance of individual combiners. The primary advantages of the test fixture are that it replicates the head-up display configuration, the measurements that are made are binocular, and the measurement time is less than one minute per combiner as opposed to a comparable time of 60 minutes using a theodolite. The test fixture determines actual coordinates of an image produced by the combiner. These coordinates allow accurate and quantitative calculations to be made, which include vertical disparity, image distance, percent distortion, and image size.

The cameras are adjustable in a manner that simulates the motion of human eyes as well as the motion of the human head. A calibration mode that is part of an operational software program is used with calibration targets and allows the cameras to be precisely positioned. This minimizes measurement error, and provides for excellent repeatability from lot to lot and day to day.

The present invention is very useful in quickly determining the quality of the optical elements of a head-up display system. The test fixture and its software program may be easily reconfigured for testing many different head-up display optical systems.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DESCRIPTION OF THE PREFERRED EMBODIMENTS

Figure 1:
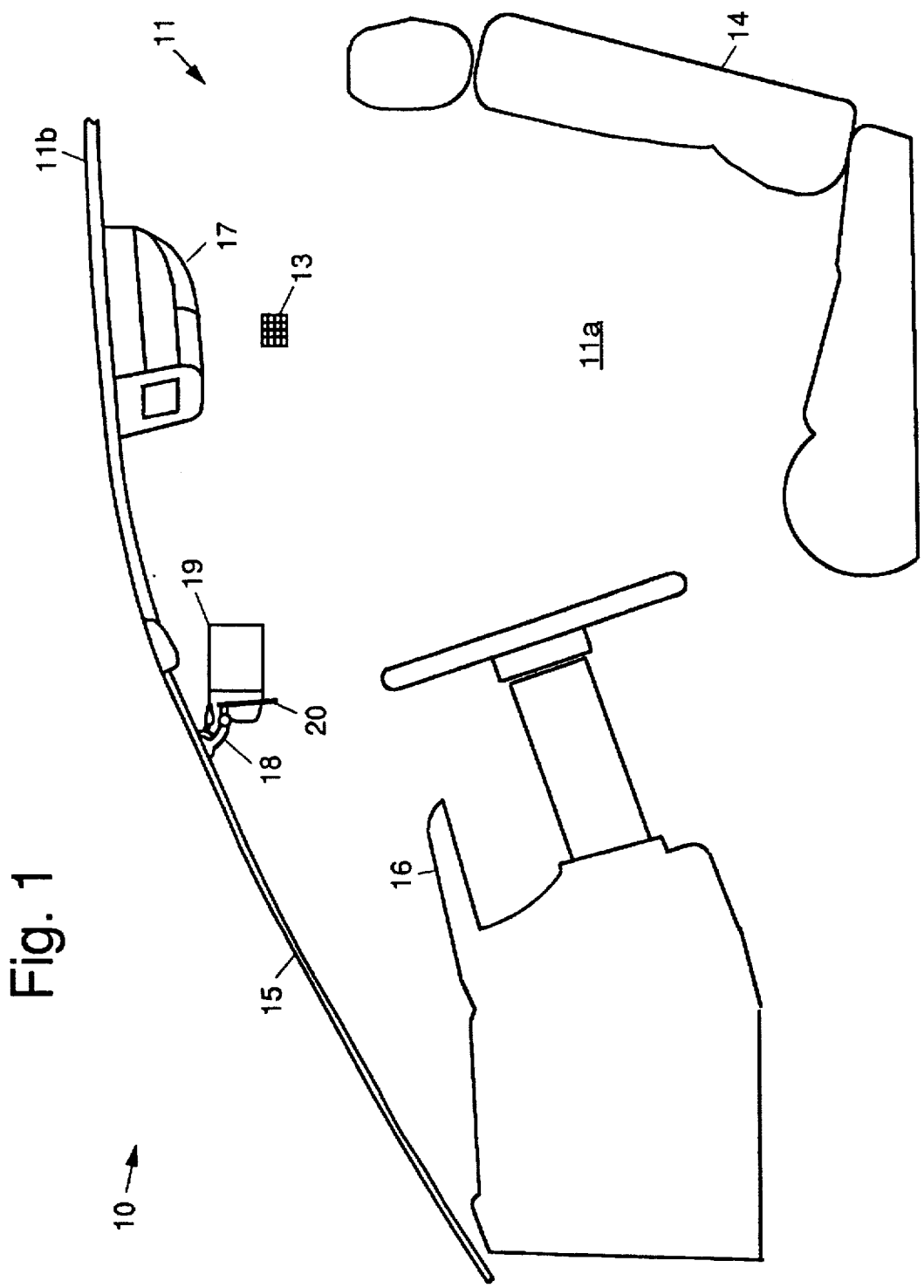
FIG. 1 is a side view of an automotive head-up display optical system that is duplicated and tested by a test fixture in accordance with the principles of the present invention.
Figure 2:
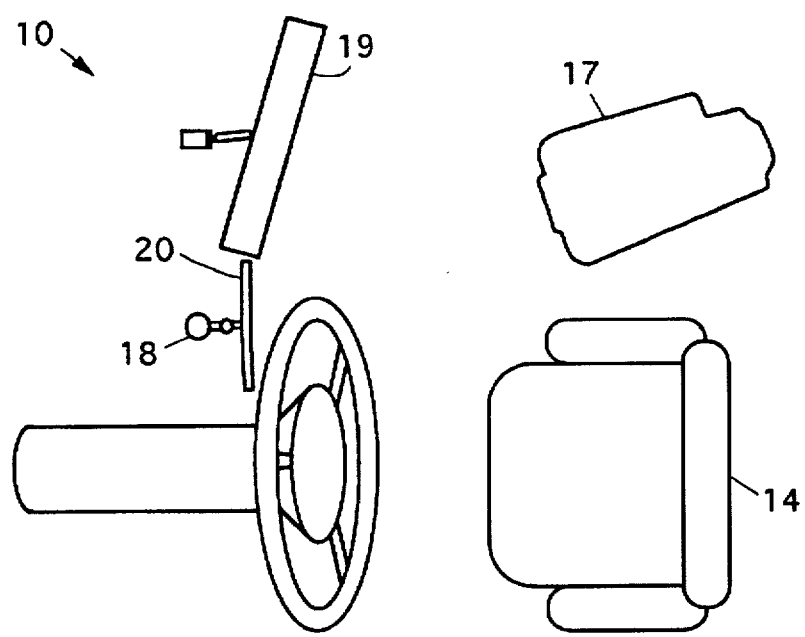
FIG. 2 is a top view of the automotive head-up display optical system of FIG. 1.

Referring to the drawing figures, FIGS. 1 and 2 show side and top views, respectively, of an automotive head-up display optical system 10 that is duplicated and wherein its optical combiner 20 is tested by a test fixture 30 and test apparatus 40 in accordance with the principles of the present invention. More specifically, FIGS. 1 and 2 show a vehicle 11 having a passenger compartment 11a and a roof 11b, and having an eyebox 13 located above a seat 14. The vehicle 11 has a windshield 15 and a dashboard 16 that are conventional.

A projection unit 17 or image display source 17 is attached to the roof 11b of the vehicle 11. The image display source 17 is disposed off-axis relative to the line of sight of an operator. The image display source 17 is thus disposed at an angle relative to the operator's forward viewing direction. The image display source 17 projects different types of image data including sensor and communications data, such as are provided by radar systems, computers, or modems, for example, or may project such image data as fuel and temperature gages, or other operating conditions of the vehicle 11, for example. In the overhead head-up display system 10 shown in FIGS. 1 and 2, a toric optical combiner 20 is employed. The toric combiner 20 is shown attached to the windshield 15 by means of a ball and socket connection 18, for example. A conventional rear view mirror 19 is also shown that is disposed adjacent to the combiner 20. Details of the automotive head-up display optical system 10 may be found in U.S. patent application Ser. No. 08/316,145, filed Sep. 30, 1994, entitled "Off-Axis Heads-Up display System employing a Toric Combiner", for example, and which assigned to the assignee of the present invention.

Figure 3:
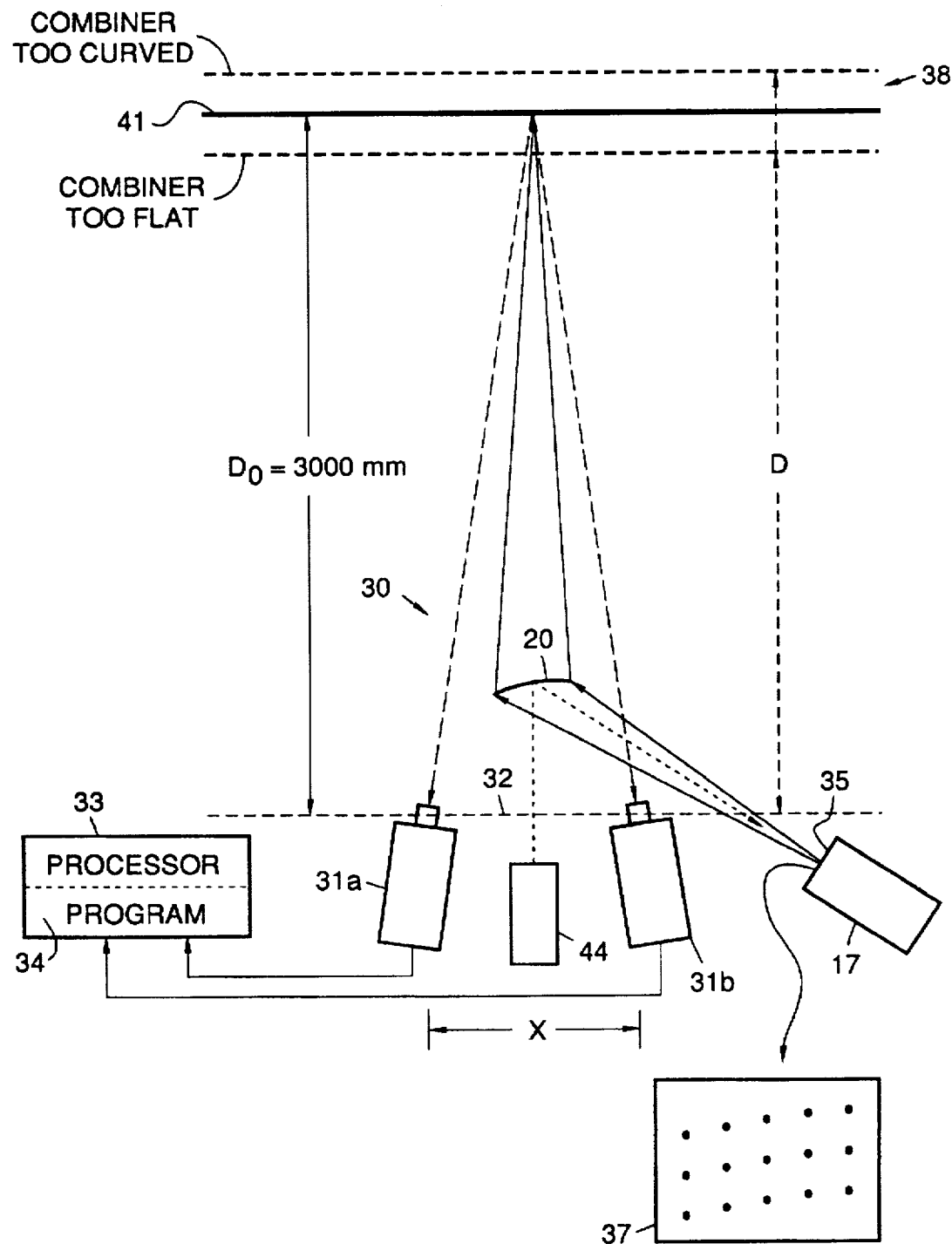
FIG. 3 is a diagram illustrating a test fixture in accordance with the principles of the present invention.

FIG. 3 is a diagram illustrating the test fixture 30 in accordance with the principles of the present invention. As is illustrated in FIG. 3, the test fixture 30 duplicates the configuration of the automotive head-up display system 10. There are two cameras 31a, 31b whose entrance pupils are disposed at the location of the center of an eyebox 32 (corresponding to the eyebox 13 of the actual head-up display optical system 10 of FIGS. 1 and 2), that replicate the function of a user's eyes. The cameras 31a, 31b are separated by a predetermined distance (X) that corresponds to the interocular distance of the user. The distance (X) is generally 64 mm±32 mm from center. The cameras 31a, 31b are coupled to a computer processor 33 that processes images generated thereby. The image processing is performed by a computer program 34 specifically written for use with the test fixture 30.

Figure 4A:
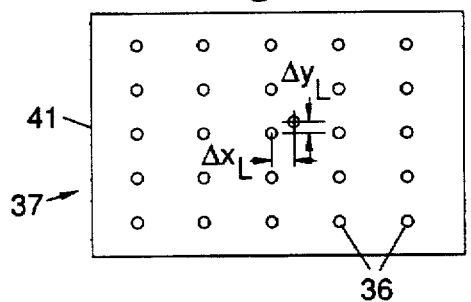
FIG. 4 illustrates test patterns and images useful in understanding the calibration and testing performed by the test fixture of FIG. 3.
Figure 4B:
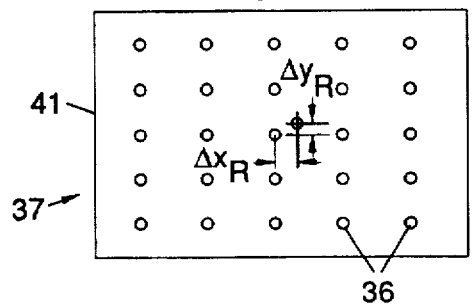

The combiner 20 and projection unit 17 are located as they would be in the vehicle 11. The projection unit 17 is fitted with a test reticle 35 consisting of dots 36 arranged in a predistorted test pattern 37 such as is shown in FIGS. 4a and 4b. The arrangement of dots 36 on the predistorted test pattern 37 is such that when magnified by a perfectly made combiner 20, the resulting image will appear rectilinear when viewed by a camera 31a, 31b or by a user. The predistorted test pattern 37 is magnified by the combiner 20 to form a virtual image 38 at approximately 3 meters from the cameras 31a, 31b. A rectilinear target 41 is placed 3 meters from the cameras 31a, 31b (at the location where the virtual image 38 is normally located). This target 41 represents what the projected predistorted test pattern 37 of dots 36 should look like if the optical combiner 20 is made perfectly. The arrangement of dots on the predistorted test pattern 37 or grid is calculated using an optical ray tracing program, which traces the path of actual rays as they traverse the optical system, such as the Hexagon optical design program. A bundle of rays in a rectilinear pattern is traced from the eye to the grid and the points where each ray intercepts the grid are recorded. These positions are used to produce the predistorted test pattern 37. The combiner 20 is aligned relative to the image display source 17 using a laser 44. The laser beam from the laser 44 is reflected off of the combiner 20 and onto the test pattern 37 and the combiner 20 is aligned so that the beam impinges upon the test pattern 37 at a predetermined location.

The cameras 31a, 31b image what the user's eyes would see. The cameras 31a, 3b first capture the image of the target 41 and the software program 34 calculates the x and y coordinates of each dot 36 as is illustrated in FIGS. 4a and 4b. This data is then stored and used as a reference that the projected image should duplicate. A test combiner 20 is then placed in the test fixture 30, and the target 41 is blocked from view. Each camera 31a, 31b then views the projected image. These images (one each for the left and right eyes) are then stored and processed by the software program 34 in the processor 33, such that the coordinates of the center point of each dot 36 is determined. The center of each dot 36 is calculated in the same way that calculation of the center of mass of an object of varying density is made. Pixel values above a threshold value are used. Column and rows of pixel values are summed, and the average pixel values x and y are calculated. The average pixel values are calculated using the equations $x = \Sigma j \cdot x_j / \Sigma x_j$ and $y = \Sigma j \cdot y_j / \Sigma y_j$.

Calculations are then made, using the image locations of the left and right dots 36 with respect to each other, and the left and right dots 35 with respect to the dot locations of the target 41. Determining the coordinates of each of the dots 36 makes many calculations possible. These calculations provide numerical data that are indicative of vertical and horizontal disparity, which are used to determine the optical quality of the combiner 20.

The operation of the test fixture 30 including the software program 34 used in cooperation with the two cameras 31a, 31b is described below. The software program 34 presented below compares images derived from the left and right cameras 31a, 31b to each other and also to the target 41. The following calculations are performed:

There are three fundamental quantities that are calculated, namely (1) the difference between the disparity of the left and right cameras 31a, 31b corresponding to vertical and horizontal disparity, (2) the difference between left and target patterns and right and target patterns in the vertical and horizontal planes that correspond to average vertical and horizontal distortion, and (3) the magnification in image size or field of view (FOV) in the vertical and horizontal directions. The disparity is the difference between images viewed by the left and right cameras 31a, 31b while the distortion is the difference between images viewed by the cameras 31a, 31b and the target 41, which corresponds to the average difference between where the dots 36 appear and where they are expected to appear. The vertical magnification is the average vertical position of the top row of dots 36 minus the average vertical position of the bottom row of dots 36 in degrees, while the horizontal magnification is the average horizontal position of the leftmost column of dots 36 minus the average horizontal position of the rightmost column of dots 36 in degrees. The left and right camera magnifications are then averaged to produce the average vertical and horizontal magnification.

The difference in vertical position of the dots 36 as seen in the left and right eyes or cameras 31a, 31b is the vertical disparity. The amount of vertical disparity is calculated for each dot 36 and then an average is taken. The average vertical disparity is calculated using the equation $\Sigma(Y_L - Y_R)$/n. The horizontal disparity is calculated using the equation $\Sigma(Y_L - Y_R)$/n. The average horizontal distortion is calculated using the equation $[\Sigma(X_L - X_T) + \Sigma(X_R - X_T)]/n = \Sigma[(X_L + X_R)/2 - X_T]/n$. The average vertical distortion is calculated using the equation $[\Sigma(Y_L - Y_T) + \Sigma(Y_R - Y_T)]/n = \Sigma[(Y_L + Y_R)/2 - Y_T]/n$.

The differences in dot locations generated by the target 41 and the combiner 20 are calculated as follows:

1) The average horizontal distortion is given by $|\Sigma(X_T-X_L)/X_T)|/n$ for the left camera 31a, and $|\Sigma(X_T-X_R)X_T)|/n$ for the right camera 31b.

2) The average vertical distortion is given by $|\Sigma(Y_T-Y_L)/Y_T)|/n$ for the left camera 31a, and $|\Sigma(Y_T-Y_R)/Y_T)|/n$ for the right camera 31b.

3) The average image distance D is then computed by calculating the image distance of each dot 36 and then averaging them. The average image distance of each individual dot 36 is determined in the following way. It is known that if the image is located at three meters, the dots 36 seen by the left and right cameras 31a, 31b would be superimposed. This is because the cameras 31a, 31b are calibrated such that they triangulate to the three meter distance. If there is a difference in the horizontal distance between two dots 36 viewed by the left and right cameras 31a, 31b, then the focus is either farther out, or closer in. The calculations determine the actual image distance from this information. The average image distance D is calculated from the horizontal disparity as:

$$D = \text{Sum of }[\text{delta }XIX_R + LRTargetoffsetX) + (m_L - m_R)] + \text{n-dots},$$

where deltaXIX$_R$ is the difference between the centers of the dots as seen by the left and right cameras, $m_L$=arctan(3000 mm/($X_R$(ct+32))), $m_L$=arctan(3000 mm/($X_R$(ct–32))), LRTargetoffsetX is the offset between the center dot of the target 41 as seen by the left and right cameras, and PixelToMilRad is the conversion from pixels to milliradians.

4) The average absolute vertical disparity is measured for each dot 36. However, in this calculation, the amount of vertical disparity of each dot 36 is made positive and then averaged. This is advantageous in two ways. Firstly, cancellation of the disparity of some dots 36 due to negative values does not occur, and which would yield a falsely low disparity value. Also, comparison between the average vertical disparity and average absolute vertical disparity provides a reference as to how much swing exists between positive and negative disparity values. The average absolute vertical dispaxity is computed as follows:

a) average vertical disparity=[sum of (yleft–yright)/n] *5PI/100/deltaYtotal b) average absolute vertical disparity=[sum of (absolute value of (yleft–yright)/n)]*5PI+100+deltaYtotal where yleft=y coordinate of the center of a dot 36, yright=y coordinate of the center of a dot 36, n=Total number of dots 36, deltaYtotal=average vertical field of view in pixels.

5) The maximum vertical disparity is calculated for each row of dots 36. As before, each dot 36 has its own vertical disparity value. Then for each row of dots 36, the maximum swing between disparity readings is taken. For example, a row of five dots 36 may have disparity readings o (3, 2.5, 1, −1, −1.5). The disparity swing for that row is then 3+1.5= 4.5. Then each row is compared to each other row, and the row with the highest difference (swing in disparity) is the maximum vertical disparity, the maximum vertical disparity (mrad) is computed as follows:

$$\text{Max}[\text{max}(yleft-yright)rowi-\text{min}(yleft-yright)rowi]$$

where rowi=for each row, where i=1 to the number of rows.

6) The vertical field of view is the angle from the eye that the image subtends vertically (top to bottom). This is determined by averaging the vertical position of the top row of dots 36, averaging the position of the bottom row of dots 36, for the left camera 31a and subtracting them. The same is done for the right camera 31b. The vertical field of view for the left and right cameras 31a, 31b are then averaged. The vertical field of view is calculated as follows:

$$\text{VFOV} = [\text{AVG}(yleft11:yleft\ 19) - \text{AVG}(yleft71:yleft79) + \text{AVG}(yright71:yright79)\text{AVG}(yright71:yright79)]*\tfrac{1}{2}.$$

7) The horizontal field of view is the angle from the eye which the image subtends horizontally (left to right). The calculation is performed in the same way as for the vertical field of view outlined above. The horizontal field of view is calculated as follows:

$$\text{HFOV} = [\text{AVG}(yleft11:yleft\ 19) - \text{AVG}(yleft71:yleft79) + \text{AVG}(yright71:yright79)\text{AVG}(yright71:yright79)]*\tfrac{1}{2}.$$

The above calculations are the primary calculations that are used in determining the optical quality of the combiner 20. There are many other calculations that can be done because the position of the image in so many places is known. VFOV and HFOV calculations determine if the overall shape of the combiner 20 is too flat or too curved. Typical goals are VFOV=5 degrees and HFOV=7 degrees. Results of ±0.25 degrees have been achieved. Average absolute vertical disparity should be <2 mrad, and results around 1 mrad have been achieved. Maximum vertical disparity should be less than 3 mrad, and results around 2 mrad have been achieved.

The test fixture 30 has been critical to producing an acceptable combiners 20. Testing a toric surface is very difficult. There is no standard way of determining its shape. The radii of the combiner 20 can be measured, but it is difficult to determine the smoothness of the surface. Disparity has been proven to be a difficult thing for the eyes to adjust to and it causes headaches, eye strain and nausea to varying degrees in different people. Disparity is a problem because the eyes see two dots where there should be one, so the mind must reconcile the two. This is difficult to achieve for extended periods of time. The degree of difficulty also varies from person to person. Also, a consistent disparity across the surface of the combiner 20 seems to be more easily tolerated than a changing disparity. Also, because the combiner 20 is injection molded plastic, the test fixture 30 has been used in developing a substantially improved process for injection molding which results in a combiner 20 with better form, and one that also withstands the temperature variation during its coating process and trimming it is subjected to thereafter. Without the test fixture 30, this would not have been possible. Combiners 20 previously had average disparity values in the 3–4 mrad range, and maximum disparity values were nominally a bit below 5 mrad, but they varied greatly and were as high as 10 mrad. Therefore, the ability to measure the optical properties of a virtual image through the toric combiner 20 provided by the present invention has been critical to the head up display system 10 in which it is employed.

Also, the test fixture 30 is a dramatic improvement over prior methods of testing the shape of the combiner 20. The use of a theodolite to take angle measurements of various dot locations took around an hour, and the present test fixture 30 does a more thorough job in less than a minute. A Ronchi test was also previously used that produces an interference pattern. This test, as well as other standard optical measurements, do not produce quantitative numbers such as disparity as does the present invention. Another test used was to measure the combiner 20 on an XYZ measuring machine. This was both slow and expensive and did not produce quantitative performance data.

Automatic white thresholding may be performed as part of the software program 34. This feature allows testing of combiners 20 that vary in reflectance from nominal, such as newly made uncoated combiners 20 and fully coated combiners 20. The computer program 34 extracts data from the images by converting features such as dots within each image to discrete objects. Each object is described numerically by its size, shape and location. The dots are converted from images to objects using edge detection of the dots, and then the center of mass is calculated. The computer program 34 used in the present invention computes data in accordance with the above equations may be written in the C programming language, for example. the programming is considered routine to those skilled in software development.

The test fixture 30 and test apparatus 40 have been built and used to test DataVision™ head-up display combiners 20 manufactured by the assignee of the present invention. The accuracy and repeatability of the test fixture 30 and test apparatus 40 far exceed the requirements imposed on the combiners 20. The present test fixture 10 measures more points than are measured using the manual test mentioned in the Background section, resulting in more thorough inspection of the combiners 20. Each combiner is tested in approximately one minute, resulting in a more cost-effective testing procedure.

The combiner test fixture measures the actual performance of the tested combiner 20 as opposed to measuring the shape of the combiner 20 and trying to correlate the shape to the performance. Previous test fixtures attempted to measure the deviation of the combiner surface from nominal. An optical designer attempts to calculate the maximum allowable surface deviation that will produce acceptable performance. However, such calculations fail since there can be some deviations of the surface that are greater than the maximum allowable deviation that will result in improved optical performance. This usually results in a surface that is specified much tighter than is necessary and costs much more to produce.

The second reason a performance test is necessary is that head up display combiners 20 are less precise than typical imaging optics and use surfaces that are highly aspheric. Because of this, they cannot be measured with conventional optical methods such as interferometry. Interferometry is useful in testing surfaces that deviate only a few wavelengths from a spherical shape. The present combiners 20 deviate hundreds or thousands of wavelengths from spherical, which makes counting interference fringes impractical.

Thus there has been described a new and improved test fixture and apparatus for use in testing a head up display system having a combiner. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. Test apparatus for testing a combiner of a head up display optical system that comprises a projection unit and the combiner, said test apparatus comprising:

a test reticle having a predistorted test pattern comprising a plurality of dots disposed in the projection unit, said pattern being configured to produce a rectilinear image when viewed with a correctly-made combiner;

a test fixture for holding the combiner, such that the combiner magnifies the predistorted test pattern to form a virtual image at a predetermined distance in front of the projection unit;

left and right cameras disposed a predetermined distance apart that are angled with respect to the combiner so as to replicate the function and separation of human eyes;

a rectilinear target disposed a predetermined distance from the cameras for calibrating the test apparatus;

a processor coupled to the left and right cameras for (1) calibrating the test apparatus by processing images of the rectilinear target produced by the cameras, for calculating x and y coordinates of centers of each dot in the test pattern, and for storing the coordinates for use as a reference that images produced by the test reticle should duplicate, and for (2) testing the combiner by processing images of the test reticle projected through the combiner and produced by the cameras, for storing the images of the projected test reticle produced by the cameras, for determining the coordinates of the center point of each dot of the projected test reticle, and for (3) calculating a plurality of values using the data produced by calibrating and testing the combiner that are indicative of the optical quality of the combiner.

2. The test apparatus of claim 1 wherein the plurality of values comprise vertical and horizontal disparity values.

3. The test apparatus of claim 1 wherein the plurality of values comprise average vertical and horizontal distortion values.

4. The test apparatus of claim 1 wherein the plurality of values comprise a value corresponding to magnification in image size in vertical and horizontal directions.

5. The test apparatus of claim 1 wherein the target 41 represents what the projected predistorted test pattern of dots should look like if the optical combiner is perfectly made.

* * * * *